UNITED STATES PATENT OFFICE.

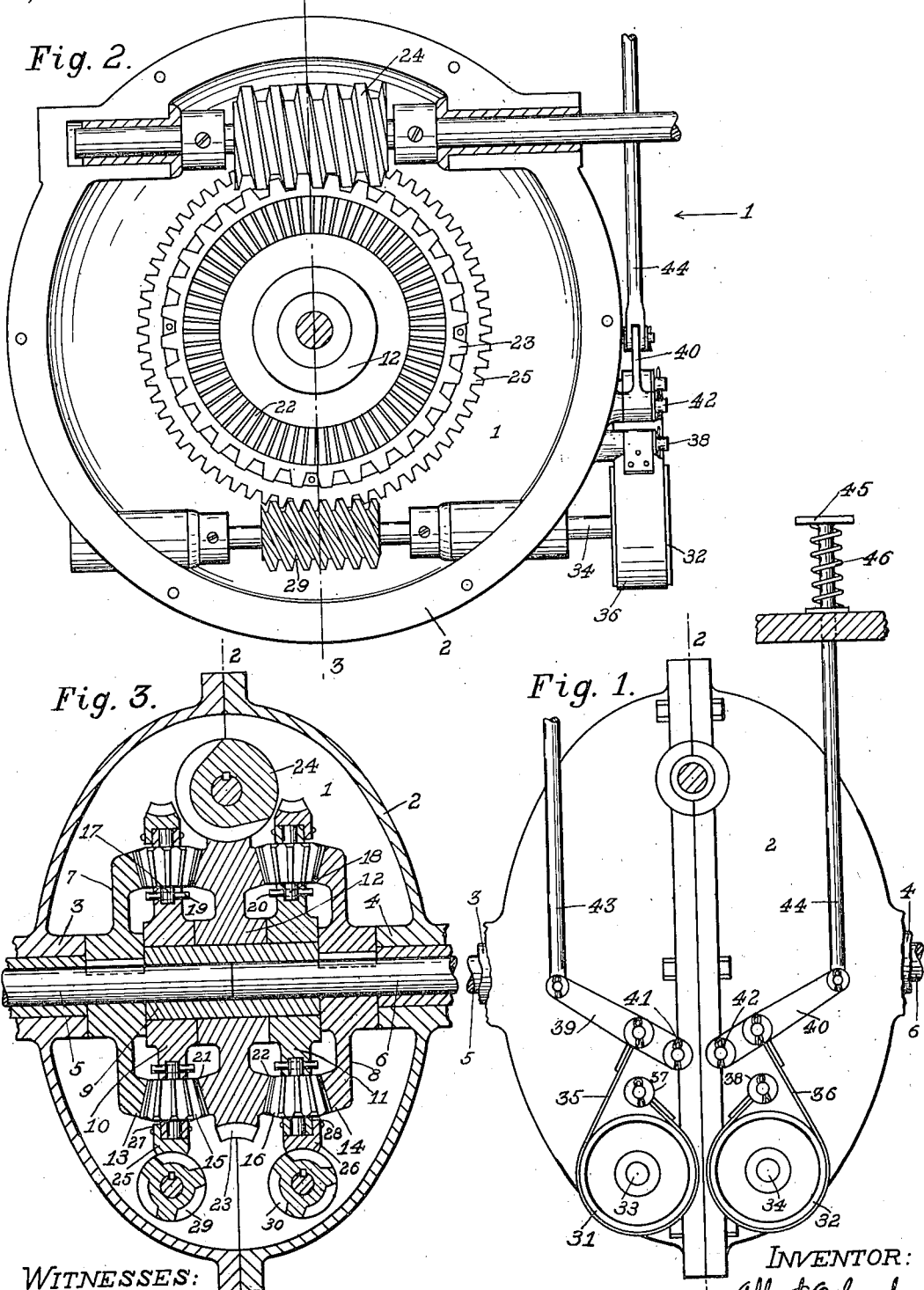

ALBERT O. LEEDY, OF BELLVILLE, OHIO.

POWER STEERING-GEAR.

1,207,058.    Specification of Letters Patent.    Patented Dec. 5, 1916.

Application filed February 24, 1916. Serial No. 80,191.

*To all whom it may concern:*

Be it known that I, ALBERT O. LEEDY, a citizen of the United States, residing at Bellville, Ohio, have invented a new and useful Power Steering-Gear, of which the following is a specification.

My object is to provide an easy means for steering motor vehicles and especially heavy tractors, and my invention consists of the novel features herein set forth; so as to make it possible to turn around on the ground it covers standing still, or, in other words, to provide means whereby a tractor or the like may make the short turns desired on a small farm; or in other words to secure the quick and complete action of steering and control, necessary to the operator, for use on the average farms where sharp right angle and complete parallel turns are essential.

Figure 1 is an elevation as seen looking in the direction indicated by the arrow 1 in Fig. 2. Fig. 2 is a vertical cross section on the lines 2—2 of Figs. 1 and 3. Fig. 3 is a vertical longitudinal section on a plane parallel with Fig. 1 and on the line 3—3 of Fig. 2.

The gear case chamber 1 is inclosed by the gear case 2 which may be formed of two or more pieces in the usual manner. The bearings 3 and 4 are formed in a straight line through the center of the gear case.

The driving wheels of the vehicle or tractor are to be mounted upon, or connected to the independent axles 5 and 6, said axles extending through the bearings 3 and 4 and meeting end to end at the transverse center of the gear case. The bevel driving gear hubs, 7 and 8, are fixed upon the axles 5 and 6 against the inner faces of the bearings 3 and 4. A sleeve 9 is mounted loosely upon the axles 5 and 6 between the hubs 7 and 8 and overlapping the break between the ends of the axles so as to hold the axles in a line. The bevel pinion carriers 10 and 11 are loosely mounted upon the sleeve 9 against the inner faces of the hubs 7 and 8 and the driving gear hub 12 is loosely mounted between the carriers 10 and 11. The bevel gears 13 and 14 are carried by the hubs 7 and 8. The bevel pinions 15 and 16 are mounted through openings in the carriers 10 and 11 in positions to mesh with the gears 13 and 14, shafts 17 and 18 are inserted from the peripheries of the carriers 10 and 11, through the pinions 15 and 16 and held in place by pins 19 and 20. The bevel gears 21 and 22 are formed upon the hub 12 in place to mesh with the pinions 15 and 16. A worm gear 23 is formed upon the periphery of the hub 12 integral with the bevel gears 21 and 22 and the driving worm 24 is mounted in the gear casing 2 in position to mesh with the worm 23, so that when the worm 24 is driven, power is transmitted through the bevel gears 21 and 22, the bevel pinions 15 and 16, and the bevel gears 13 and 14 to the axles 5 and 6.

The carriers 10 and 11 are circular and the brake worm gears 25 and 26 are rings fitting the peripheries of the carriers and are held in place by flanges 27 and 28 bolted to the carriers. The brake worms 29 and 30 are mounted in the gear case 2 in positions to mesh with the brake worm gears 25 and 26. Brake wheels 31 and 32 are fixed upon the shafts 33 and 34 of the brake worms outside of the gear case. Brake bands 35 and 36 are rigidly connected to pintles 37 and 38 fixed in the gear casing and encircle the brake wheels 31 and 32 and are connected to the brake levers 39 and 40, said brake levers being mounted upon pivot pins 41 and 42 fixed in the gear casing. Push rods 43 and 44 are vertically mounted and connected to the swinging ends of the levers 39 and 40. Pedals 45 are fixed upon the upper ends of the push rods 43 and 44 and springs 46 push upwardly on the push rods to hold the brake bands 35 and 36 normally tight, so as to hold the carriers 10 and 11 from rotating.

The driving worm 24 is to be operated by the engine or motive power. The brake worms 29 and 30 are a steep pitch so that they can be driven either way by the brake worm gears 25 and 26. If the push rods 43 and 44 are both pushed downwardly to release the brake; the bevel pinion carriers 10 and 11, will rotate and the bevel pinions 15 and 16 will run idle and no power will be transmitted to the axles 5 and 6. If it is desired to go straight ahead or backward both push rods are released so that the brakes will hold, then the bevel pinions 15 and 16 become transmission gears and the axles 5 and 6 are driven. If it is desired to turn one way or the other, the corresponding push rod is operated to release the brake, thus disconnecting the power from the driving wheel, around which it is proposed to turn and in this way the tractor may be turned with one drive wheel as the pivot. By making a quarter turn upon one drive wheel and then reversing the power and turning upon the other drive wheel the tractor may be turned half around upon a pivot plane half way between the drive wheels. In the foregoing operation it is assumed that the third wheel of the tractor is a caster. The driving power steers the tractor, the only manual power required being for releasing the brakes. If desired the axles 5 and 6 may be connected to the drive wheels by chains or otherwise, instead of having the drive wheels mounted directly upon these axles.

The leading or most essential features are the two axles or shafts mounted in a line, two driven bevel gears fixed upon the inner end portions of said shafts, bevel pinion carriers loosely mounted between the bevel gears and carrying bevel pinions meshing with the driven bevel gears, driving bevel gears rigid with each other and loosely mounted between the bevel pinions and in mesh therewith, means for driving the driving bevel gears, and means for intermittently holding the bevel pinion carriers from rotating, so as to transmit power to either or both shafts as desired. The form of connection between the driving bevel gears and the motive power is preferably the worm and worm gear, but this is not essential to the general purpose. For instance a sprocket and chain might be used. Likewise the form of brake mechanism may be varied.

I claim:

A power steering gear comprising two axle shafts mounted in a line, two driven bevel gears fixed upon the inner end portions of said shafts; two bevel pinion carriers rotatably mounted between the bevel gears, bevel pinions mounted in the carriers and meshing with the bevel gears, driving bevel gears rotatably mounted between the bevel pinion carriers and meshing with the bevel pinions, means for operating the driving bevel gears, and means for intermittently holding or releasing either or both of the bevel pinion carriers from rotating, so as to transmit power to either or both axle shafts as desired to go straight ahead or backward, or turn in either direction.

ALBERT O. LEEDY.

Witnesses:
STANLEY VISEL,
SEMER G. WELLS.